(12) United States Patent
Sato

(10) Patent No.: US 6,882,483 B1
(45) Date of Patent: Apr. 19, 2005

(54) OPTICAL SYSTEM WITH PARTICULAR OPTICAL DISTORTION

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/951,590

(22) Filed: Sep. 29, 2004

(30) Foreign Application Priority Data

Oct. 1, 2003 (JP) ...................................... 2003-343028

(51) Int. Cl.$^7$ ............................................. G02B 13/18
(52) U.S. Cl. ................................................... 359/708
(58) Field of Search ........................ 359/708, 713–717, 359/753

(56) References Cited

FOREIGN PATENT DOCUMENTS

JP        2000-258684        9/2000

*Primary Examiner*—Scott J. Sugarman
*Assistant Examiner*—Jack Dinh
(74) *Attorney, Agent, or Firm*—Arnold International; Jon W. Henry; Bruce Y. Arnold

(57) ABSTRACT

An optical system satisfies conditions related to the optical distortion at the maximum image height and at eighty and sixty percent of the maximum image height in order to reduce the actual observed distortion of an image, for example, an image on a monitor, by balancing the optical distortion with TV distortion. The optical system may be a single focus lens that includes, in order from the object side: a diaphragm stop; and first and second lens components. An aspheric equation that includes a nonzero aspheric coefficient of order three or higher may determine an aspheric shape of a lens surface of the second lens component. Both lens components may be made of plastic.

6 Claims, 8 Drawing Sheets

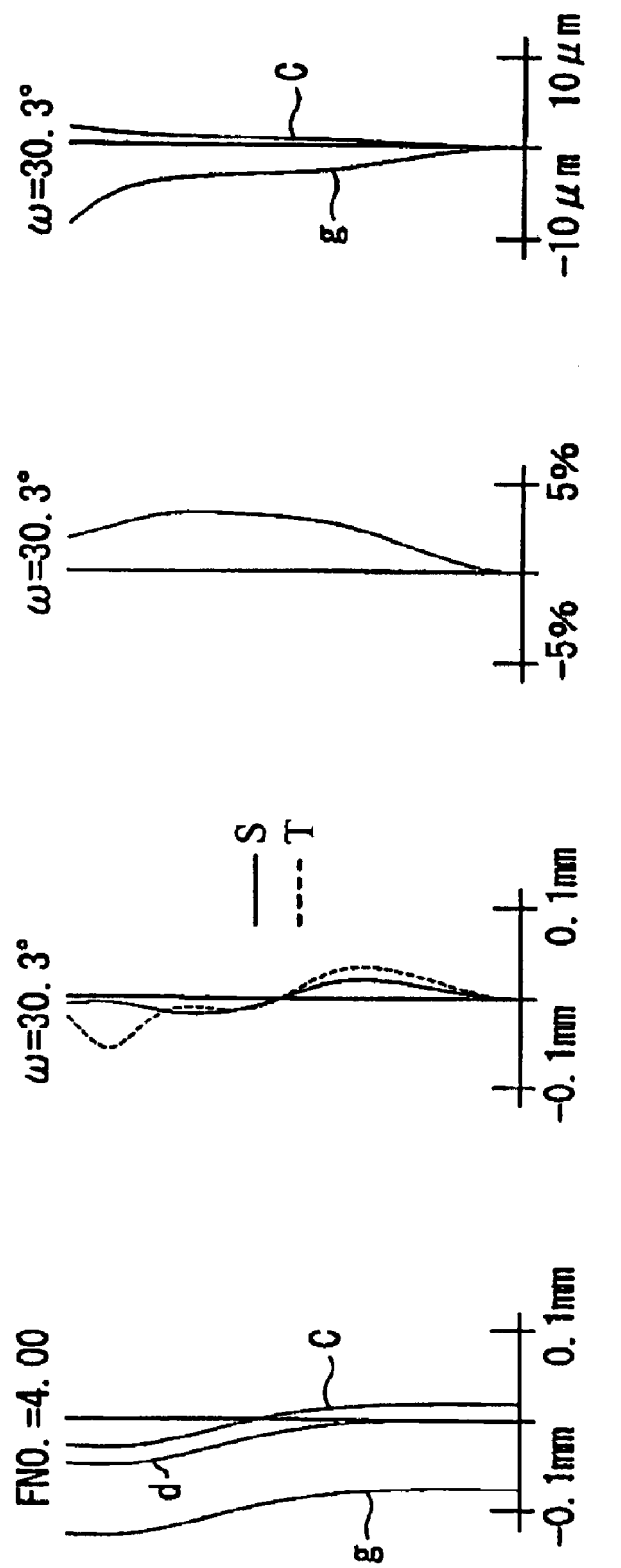

Lateral Color

Distortion

Astigmatism

Spherical Aberration

OPTICAL SYSTEM WITH PARTICULAR OPTICAL DISTORTION

BACKGROUND OF THE INVENTION

In recent years, along with the popularization of personal computers into homes, digital still cameras (hereinafter referred to simply as digital cameras) that enable input of picture image information, such as photographed landscapes and portraits, into a personal computer are rapidly becoming more popular. Additionally, with enhancements in portable telephone functions, portable cameras that include compact imaging modules are rapidly becoming more popular. Additionally, including an imaging module in compact information terminal equipment, such as PDAs (Personal Digital Assistants), is becoming popular.

In such devices that include an imaging function, an image pickup element, such as a CCD (Charge Coupled Device) or a CMOS (Complementary Metal Oxide Semiconductor), is used to provide the imaging function. Recently, advancements in the miniaturization of such image pickup elements have been rapidly increasing. This has resulted in a desire for the main body of such devices and other imaging equipment, such as the imaging lens system, to also be further miniaturized. Additionally, image pickup elements with a larger number of pixels in the same area have been developed in order to achieve higher image quality, which creates a demand for higher resolution lens systems that are still very compact. Japanese Laid-Open Patent Application 2000-258684 describes exemplary single focus imaging lenses for such devices that include only two lens elements.

As stated above, recent image pickup elements are smaller and provide more pixels in a given detector area, which helps meet demands of higher resolution and more compactness that are especially required in imaging lenses for digital cameras. Although considerations of small cost and compactness have been the main considerations for imaging lenses for compact information terminal equipment, such as portable telephones with cameras, such devices have been commercialized with megapixel detectors (detectors that detect one million or more pixels), indicating increasing demand for higher performance in these devices as well. Therefore, development of lens systems with a wide range of applications based on properly balancing considerations of cost, performance, and compactness is desired.

As imaging lenses for compact information terminal equipment having a large number of pixels, conventionally there has been developed a lens system having three lens components, each of which may be a lens element, with at least two lens elements being made of plastic, while the third lens element may be made of plastic or glass. However, in order to meet recent demands for greater miniaturization, a lens that uses a smaller number of lens components and lens elements, but which is equivalent in performance to these conventional lenses, is desired. Although the lenses described in Japanese Laid-Open Patent Application 2000-258684, referenced above, each have a two-component, two-element lens construction, which includes aspheric surfaces, a lens system that is even more compact and higher in performance is desired.

In order to achieve high performance in imaging lenses generally, ideally all types of aberrations should be favorably corrected over the entire region of the field of view. In general, in an optical system having a large number of lens components and lens elements, nearly ideal performance may be easily achieved. However, as the number of lens components and lens elements is reduced, it becomes more difficult to achieve nearly ideal performance. As noted above, in recent years, a great demand for a high performance imaging lens having only a small number of lens components and lens elements has developed.

Therefore, conventionally, optical designs have been developed to achieve, as far as possible, excellent correction of various aberrations over the entire field of view even when the number of lens components and lens elements is small. However, with a very small number of lens components and/or lens elements, such as only two or three, it is difficult to adequately correct all of the aberrations over the entire field of view. Even so, even if aberrations partially remain, when a person views an actual imaged picture, as long as the adverse effects to the actual imaged picture viewed by an observer are small, the problems of the aberrations are considered to be practically solved.

For example, in many cases a conventional imaging lens is often designed such that optical distortion aberration of the imaging lens is minimized over the field of view. However, a picture viewed on a monitor screen is also subject to TV distortion independent of the optical distortion of the imaging lens, and therefore TV distortion should also be considered in designing an imaging lens in order to minimize the distortion of a picture when viewed on a monitor screen. For example, although optical distortion of the imaging lens may occur over the field of view, the perceived distortion of a viewed picture on a monitor screen may become unnoticeable by properly balancing optical distortion of the imaging lens and TV distortion.

Concepts of optical distortion of an imaging lens and TV distortion will now be described with reference to FIG. 8. FIG. 8 schematically shows a rectangular object that is imaged via an optical system and displayed on a TV screen. In FIG. 8, a broken line 10 shows the rectangular shape that would be the ideal representation of the rectangular object, and a solid line 11 shows the shape of an actual image that is displayed.

With reference to FIG. 8, if the ideal image height is y0 and the actual image height is y, the amount of aberration of optical distortion D is generally expressed by the following equation:

$$D=[(y-y0)/y0]\times 100 \ (\%).$$

Namely, the optical distortion D is defined by dividing the difference between the actual image height y and the ideal image height y0 by the ideal image height y0 and multiplying the quotient obtained by 100 percent in order to express the optical distortion in percentage terms.

On the other hand, again with reference to FIG. 8, the TV distortion Dt is defined by dividing the depth of curvature Δh of the long side of the actual image that ideally would have no curvature by twice the vertical height h (i.e., as measured from the optical axis, which corresponds to the center of the T.V. image) of a shorter side of the actual image and multiplying the quotient obtained by 100 percent in order to express the optical distortion in percentage terms. Thus, the TV distortion is defined by the following equation:

$$Dt=(\Delta h/2h)\times 100(\%).$$

BRIEF SUMMARY OF THE INVENTION

The present invention relates to an optical system that can be extremely compact, uses a small number of lens components and lens elements, and can achieve high optical performance with hardly noticeable distortion of an actual image. The present invention relates particularly to such a single focus lens that can be mounted in small information terminal equipment such as portable phones with a camera and in PDAs.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4D show the spherical aberration, astigmatism, distortion, and lateral color, respectively, of the single focus lens according to Embodiment 1;

DETAILED DESCRIPTION

Figure 1:
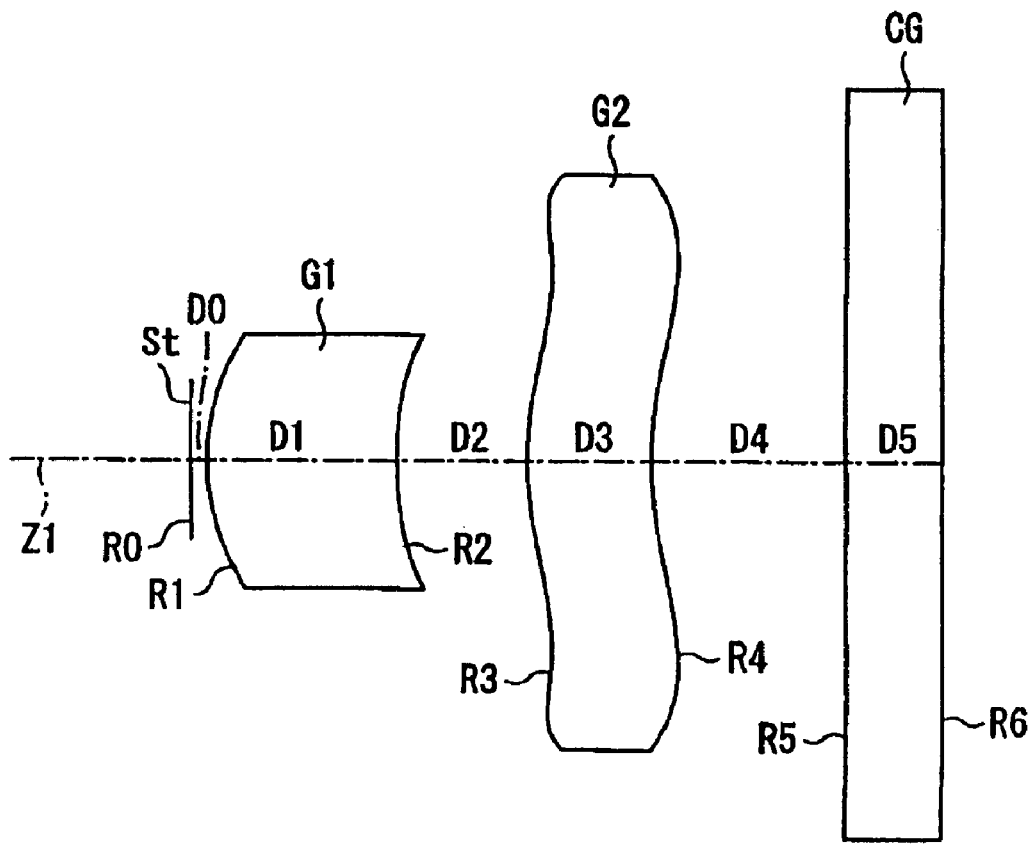
FIG. 1 shows a cross-sectional view of the single focus lens according to Embodiment 1.

A general description of the preferred embodiments of the single focus lens of the optical system of the present invention will now be described with reference to FIG. 1. FIG. 1 shows a cross-sectional view of the single focus lens of Embodiment 1. In FIG. 1, the lens elements of the single focus lens are referenced by the symbols G1 and G2, in order from the object side of the single focus lens along the optical axis Z1. Additionally, a cover glass on the image side of the second lens element G2 is referenced by the symbol CG. The radii of curvature of the lens elements G1, G2, and the cover glass CG are referenced by the letter R followed by a number denoting their order from the object side of the single focus lens, from R0 to R6. The on-axis surface spacings along the optical axis Z1 between the surfaces of the optical elements are referenced by the letter D followed by a number denoting their order from the object side of the single focus lens, from D0 to D5. In FIG. 1, the image plane (not shown) is on the image side of the cover glass CG. The single focus lens further includes a diaphragm stop St on the object side of the first lens element G1. The stop St operates as an aperture stop.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the single focus lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

In accordance with the definitions of "lens component," and "lens element" above, lens elements may also be lens components. Thus, the present invention may variously be described in terms of lens elements or in terms of lens components.

The single focus lens of the present invention can be used, for example, in a digital camera or a portable modular camera that uses an image pickup element, such as a CCD (not shown). As shown in FIG. 1, the single focus lens includes, arranged in order from the object side along the optical axis Z1, the stop St, the first lens element G1, the second lens element G2, and the cover glass CG, with the image pickup element (not shown) being at the image plane (not shown) close to and on the image side of the cover glass CG. The cover glass CG is arranged at or adjacent the image plane so as to protect the image-detecting elements of the CCD. In addition to the cover glass CG, other optical elements such as an infrared cut-off filter and/or a low-pass filter may also be arranged between the second lens element G2 and the image plane.

The first lens element G1 is of positive refractive power, is of meniscus shape with a convex surface on its object side, and has aspheric shapes on both surfaces. The second lens element G2 is of positive refractive power near the optical axis, is of meniscus shape near the optical axis with a convex surface on its object side near the optical axis that changes to a concave surface near the periphery within the effective diameter of the object-side surface of the second lens element G2 and with a concave surface on its image side near the optical axis that changes to a convex surface near the periphery within the effective diameter of the image-side surface of the second lens element G2. Thus both surfaces of the second lens element G2 also have aspheric shapes. The image-side surface of the second lens element G2 has a concave shape associated with negative refractive power near the optical axis Z1, the absolute value of the refractive power of the image-side surface decreases toward the periphery of the image-side surface within the effective diameter of the second lens element G2, and the image-side surface becomes convex near the periphery of the lens surface so that the second lens element G2 includes a part with negative refractive power within the effective diameter of the second lens component. That is, the second lens component G2 includes a central part near the optical axis having positive refractive power and includes a part outside the central part that has negative refractive power within the effective diameter of the object-side surface of the second lens component G2.

The lens surfaces that are aspheric are defined using the following equation:

$$Z = [(C \cdot Y^2)/\{1+(1-K \cdot C^2 \cdot Y^2)^{1/2}\}] + \Sigma(A_i Y^i) \quad \text{Equation (A)}$$

where
- Z is the length (in mm) of a line drawn from a point on the aspheric lens surface at a distance Y from the optical axis to the tangential plane of the aspheric surface vertex,
- C is the curvature (=1/the radius of curvature, R, in mm) of the aspheric lens surface on the optical axis,
- Y is the distance (in mm) from the optical axis,
- K is the eccentricity, and
- $A_i$ is the ith aspheric coefficient, and the summation extends over i.

In the embodiments of the invention disclosed below, aspheric coefficients other than $A_3$–$A_{10}$ are zero for all lens surfaces and some of the aspheric coefficients $A_3$–$A_{10}$ are zero for some of the lens surfaces.

The shape of each aspheric lens surface on the optical axis is expressed by the portion of Equation (A) that relates to the eccentricity K and not by the polynomial part that relates to the aspheric coefficient $A_i$.

It is desirable that at least one surface of the second lens element G2, which is the lens element nearest the image side, have an aspheric shape according to Equation (A) above with at least one non-zero odd-order aspheric coefficient $A_i$ of order three or greater, that is, an aspheric coefficient with the subscript "i" being odd and three or greater is non-zero.

Because both surfaces of each of the first lens element G1 and the second lens element G2 are aspheric, it is preferable that the lens elements be made of plastic for ease of manufacture of the lens elements.

The single focus lens is constructed so that it satisfies the following Conditions (1)–(3) related to optical distortion:

$2.0\% < |DIST6| < 5.0\%$   Condition (1)

$|DIST8-DIST6| < 0.5\%$   Condition (2)

$|DIST10-DIST8| < 1.8\%$   Condition (3)

where
- DIST6 is the optical distortion of the image at 60% of the maximum image height,
- DIST8 is the optical distortion of the image at 80% of the maximum image height, and
- DIST10 is the optical distortion of the image at 100% of the maximum image height.

In general, in an imaging lens where the number of lens components and elements is limited, such as in an optical system for a small portable device, where distortion is desired to be very small throughout the actual viewed image, there are great constraints on the optical design, including controlling the length of the entire imaging lens and controlling various aberrations. In this single focus lens, satisfying the above Conditions (1)–(3) enables obtaining an optical system where the distortion of the actual viewed image is not noticeable, without increasing the number of lens components and lens elements.

Figure 3:
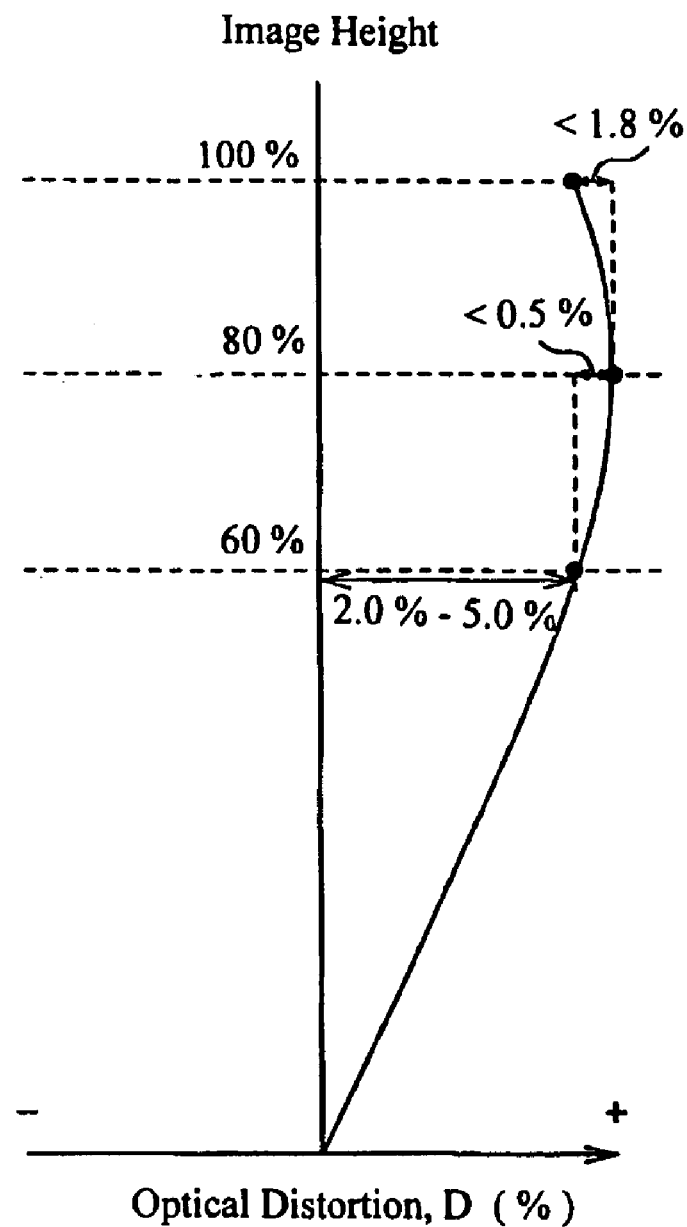
FIG. 3 shows a graph of image height versus optical distortion of an embodiment according to the present invention.

FIG. 3 shows a graph of image height versus optical distortion of an embodiment according to the present invention. The solid line curve indicates a set of limits of values satisfying Conditions (1)–(3). If the lower limit of Condition (I) is not satisfied, restrictions on the optical design become great, which is not preferable because it becomes difficult to control the entire lens length and other aberrations. Further, if the upper limit of Condition (1) is not satisfied, the actual viewed distortion obtained by balancing the optical distortion and the TV distortion becomes noticeable. Similarly, if Conditions (2) and (3) are not satisfied, the actual viewed distortion obtained by balancing the optical distortion and the TV distortion becomes noticeable.

By satisfying all of Conditions (1)–(3) simultaneously, the actual viewed distortion obtained by balancing the optical distortion and the TV distortion is practically too small to be noticed throughout the field of view, a result that may be achieved with a small number of lens components and lens elements according to the optical system of the present invention.

In order to satisfy Conditions (1)–(3), it is helpful that at least one surface of the second lens element G2, which is the closer lens to the image side, have an aspheric shape according to Equation (A) above with non-zero odd-order aspheric coefficients $A_i$, that is, aspheric coefficients with the subscript "i" being odd are non-zero, as discussed above. Additionally, it is helpful in order to satisfy Conditions (1)–(3) to use an aspheric surface having an aspheric shape according to Equation (A) above with at least one non-zero aspheric coefficient $A_i$ of the sixteenth order or higher.

By designing a single focus lens as explained above, including satisfying Conditions (1)–(3) and using aspheric surfaces effectively, an optical system formed of a single focus lens with only two lens components and only two lens elements can achieve equivalent optical performance to a conventional three-component, three-element single focus lens used conventionally in a camera system of a mobile phone. Additionally, compared to the prior art, an extremely compact lens system can be realized.

Embodiments 1 and 2 of the present invention will now be individually described with further reference to the drawings. In the following descriptions, references will be frequently made to a "lens element." However, as set forth above, it is understood that lens elements described below are also lens components and may variously be replaced by lens components that include more than one lens element.

Embodiment 1

FIG. 1 shows Embodiment 1 of the present invention. Table 1 below lists the surface number #, in order from the object side, the radius of curvature R (in mm) of each surface near the optical axis, the on-axis surface spacing D (in mm), as well as the refractive index Nd and the Abbe number $v_d$ (both at the d-line of 587.6 nm) of each optical element for Embodiment 1. Listed in the bottom portion of Table 1 are the focal length f on the optical axis of the entire single focus lens, the f-number $F_{NO}$, and the maximum field angle 2 ω.

TABLE 1

| # | R | D | $N_d$ | $v_d$ |
|---|---|---|---|---|
| 0 (stop) | ∞ | 1.10 | | |
| 1* | 1.4638 | 1.18 | 1.50614 | 56.4 |
| 2* | 2.3464 | 0.82 | | |
| 3* | 2.0905 | 0.77 | 1.50614 | 56.4 |
| 4* | 2.7466 | 1.18 | | |
| 5 | ∞ | 0.60 | 1.51680 | 64.2 |
| 6 | ∞ | | | | f = 3.94 mm
$F_{NO}$ = 4.0
2ω = 60.7°

The surfaces with a * to the right of the surface number in Table 1 are aspheric lens surfaces, and the aspheric surface shapes are expressed by Equation (A) above.

Table 2 below lists the values of the constant K and the aspheric coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 1 | −4.0691 | 0 | 2.0632E−1 | 0 | −9.1075E−2 |
| 2 | −9.6249 | 0 | 8.9875E−2 | 0 | 1.0112E−1 |
| 3 | −4.6459 | −6.3908E−3 | −1.5026E−2 | −3.9510E−2 | 3.0353E−3 |
| 4 | −8.8133 | 4.0300E−2 | 2.2635E−2 | −1.1799E−1 | 3.5354E−2 |

| | $A_7$ | $A_8$ | $A_9$ | $A_{10}$ |
|---|---|---|---|---|
| 1 | 0 | −6.0637E−3 | 0 | 5.5267E−3 |
| 2 | 0 | −4.1842E−2 | 0 | 1.1947E−2 |
| 3 | 4.4656E−3 | 5.6359E−4 | −2.1899E−3 | 1.8562E−3 |
| 4 | 2.6899E−2 | −1.2120E−2 | −5.0708E−3 | 2.4476E−3 |

The single focus lens of Embodiment 1 satisfies Conditions (1)–(3) above, as set forth in Table 3 below.

TABLE 3

| Condition No. | Condition | Value |
|---|---|---|
| (1) | 2.0% < \|DIST6\| < 5.0% | 3.17% |
| (2) | \|DIST8 − DIST6\| < 0.5% | 0.06% |
| (3) | \|DIST10 − DIST8\| < 1.8% | 1.33% |

FIGS. 4A–4D show the spherical aberration, astigmatism, distortion, and lateral color, respectively, of the single focus lens according to Embodiment 1. In FIG. 4A, the spherical aberration is shown for the d-line ($\lambda$=587.6 nm), the g-line ($\lambda$=435.8 nm), and the C-line. ($\lambda$=656.3 nm). As shown in FIG. 4A, the f-number is 4.00. In FIG. 4B, the astigmatism is shown at the d-line ($\lambda$=587.6 nm) for both the sagittal image surface S and the tangential image surface T. In FIG. 4C, the distortion is shown at the d-line ($\lambda$=587.6 nm). The half-field angle $\omega$ for FIGS. 4B–4D is 30.3°. FIG. 4D shows the lateral color at the g-line ($\lambda$=435.8 nm) and the C-line ($\lambda$=656.3 nm) relative to the d-line ($\lambda$=587.6 nm) of the single focus lens according to Embodiment 1.

Figure 6:
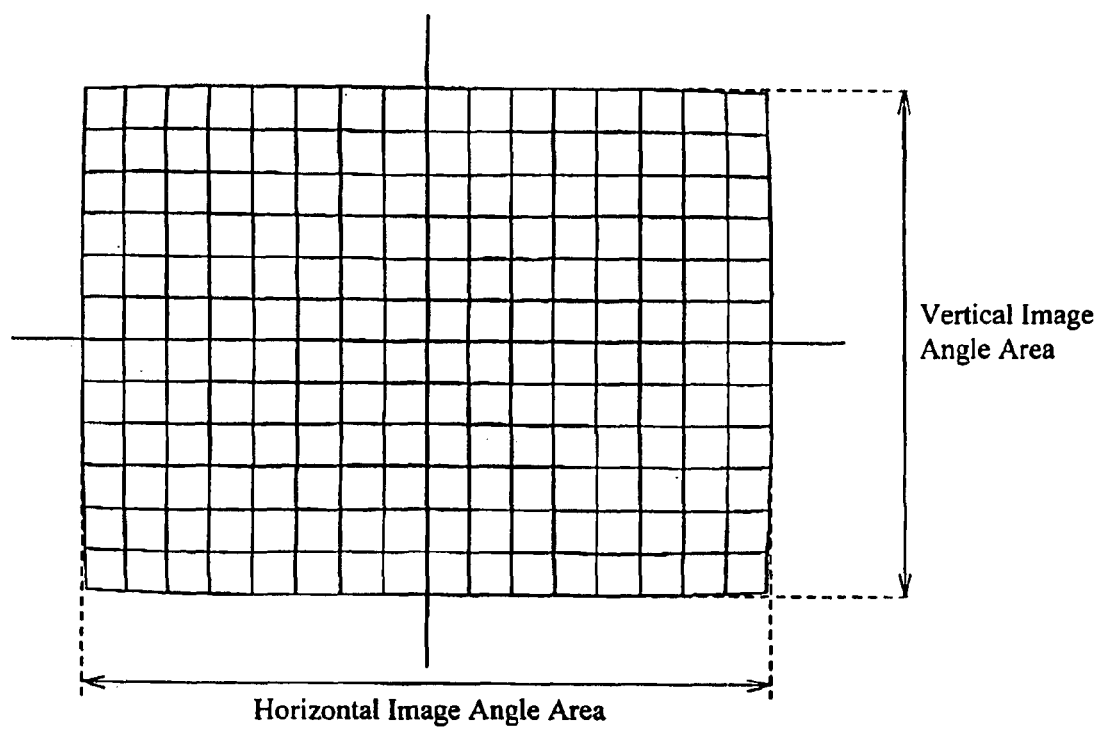
FIG. 6 is a diagram of an actual image of a rectangular grid object subject to balancing optical distortion and TV distortion of the single focus lens according to Embodiment 1.

FIG. 6 is a diagram of an actual image of a rectangular grid object subject to balancing optical distortion and TV distortion of the single focus lens according to Embodiment 1. Although FIG. 4C indicates substantial optical distortion, FIG. 6 shows that optical distortion is well balanced by TV distortion so that the distortion of the actual image of the rectangular grid object is hardly noticeable.

As is clear from the lens data and aberration curves discussed above, in Embodiment 1 the various aberrations are favorably corrected, and performance capabilities that are suitable for a compact single focus lens without noticeable distortion of an actual viewed image can be obtained.

Embodiment 2

Figure 2:
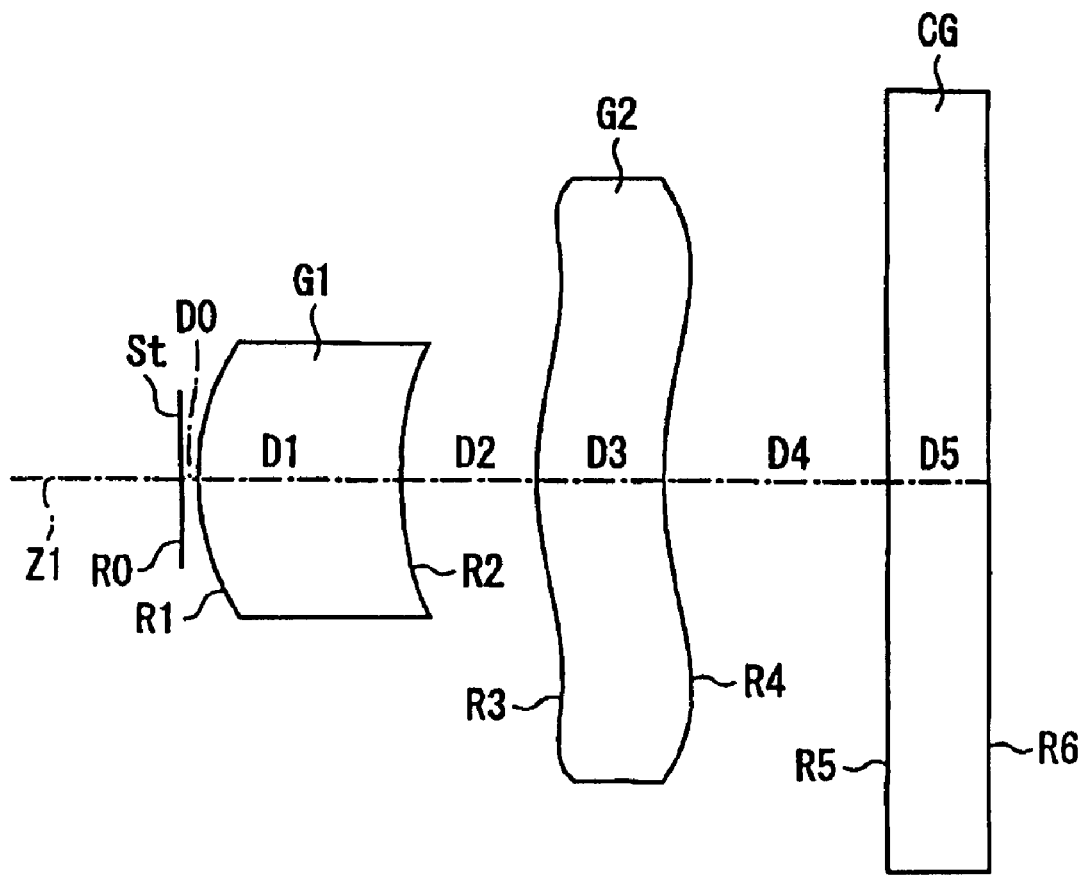
FIG. 2 shows a cross-sectional view of the single focus lens according to Embodiment 2.

FIG. 2 shows Embodiment 2 of the present invention. Table 4 below lists the surface number #, in order from the object side, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2. Listed in the bottom portion of Table 4 are the focal length f on the optical axis of the entire single focus lens, the f-number $F_{NO}$, and the maximum field angle 2 $\omega$.

TABLE 4

| # | R | D | $N_d$ | $v_d$ |
|---|---|---|---|---|
| 0 (stop) | ∞ | 0.10 | | |
| 1* | 1.4586 | 1.20 | 1.49023 | 57.5 |
| 2* | 2.3480 | 0.81 | | |
| 3* | 2.0914 | 0.76 | 1.49023 | 57.5 |
| 4* | 2.7489 | 1.30 | | |
| 5 | ∞ | 0.60 | 1.51680 | 64.2 |
| 6 | ∞ | | | | f = 4.08 mm
$F_{NO}$ = 4.0
$2\omega$ = 58.9°

The surfaces with a * to the right of the surface number in Table 4 are aspheric lens surfaces, and the aspheric surface shapes are expressed by Equation (A) above.

Table 5 below lists the values of the constant K and the aspheric coefficients $A_3$–$A_{10}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

TABLE 5

| # | K | $A_3$ | $A_4$ | $A_5$ | $A_6$ |
|---|---|---|---|---|---|
| 1 | −4.0691 | 0 | 3.4526E−6 | 0 | 2.0632E−1 |
| 2 | −9.6253 | 0 | −2.0968E−5 | 0 | 8.9873E−2 |
| 3 | −4.6459 | −6.3881E−3 | −1.5025E−2 | −3.9507E−2 | 3.0357E−3 |
| 4 | −8.8133 | 4.0299E−2 | 2.2634E−2 | −1.1799E−1 | 3.5353E−2 |

| | $A_7$ | $A_8$ | $A_9$ | $A_{10}$ |
|---|---|---|---|---|
| 1 | 0 | 1.4710E−7 | 0 | −9.1075E−2 |
| 2 | 0 | −1.2720E−6 | 0 | 1.0112E−3 |
| 3 | 4.4661E−3 | 5.6364E−4 | −2.1898E−3 | 1.8562E−3 |
| 4 | 2.6899E−2 | −1.2120E−2 | −5.0710E−3 | 2.4476E−3 |

The single focus lens of Embodiment 2 satisfies Conditions (1)–(3) above, as set forth in Table 6 below.

TABLE 6

| Condition No. | Condition | Value |
|---|---|---|
| (1) | 2.0% < \|DIST6\| < 5.0% | 3.17% |
| (2) | \|DIST8 − DIST6\| < 0.5% | 0.04% |
| (3) | \|DIST10 − DIST8\| < 1.8% | 1.28% |

Figure 5D:
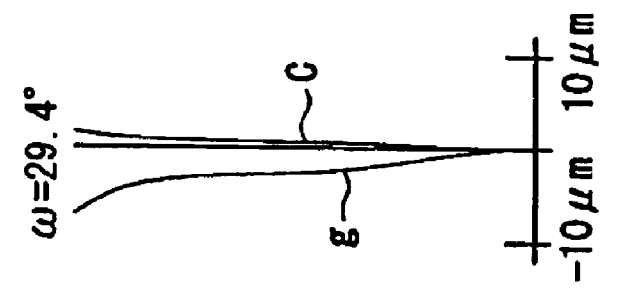
FIGS. 5A–5D show the spherical aberration, astigmatism, distortion, and lateral color, respectively, of the single focus lens according to Embodiment 2.
Figure 5C:
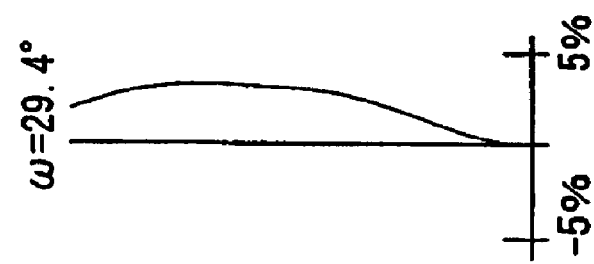
Figure 5B:
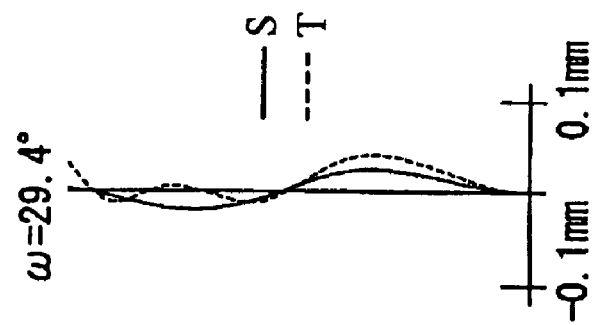
Figure 5A:
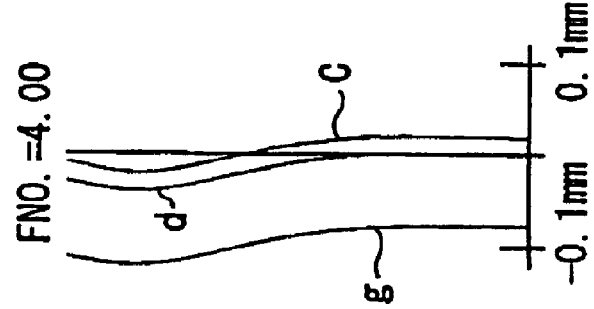

FIGS. 5A–5D show the spherical aberration, astigmatism, distortion, and lateral color, respectively, of the single focus lens according to Embodiment 2. In FIG. 5A, the spherical aberration is shown for the d-line ($\lambda$=587.6 nm), the g-line ($\lambda$=435.8 nm), and the C-line ($\lambda$=656.3 nm). As shown in FIG. 5A, the f-number is 4.00. In FIG. 5B, the astigmatism is shown at the d-line ($\lambda$=587.6 nm) for both the sagittal image surface S and the tangential image surface T. In FIG. 5C, the distortion is shown at the d-line ($\lambda$=587.6 nm). The half-field angle $\omega$ for FIGS. 5B–5D is 29.4°. FIG. 5D shows the lateral color at the g-line ($\lambda$=435.8 nm) and the C-line ($\lambda$=656.3 nm) relative to the d-line ($\lambda$=587.6 nm).

Figure 7:
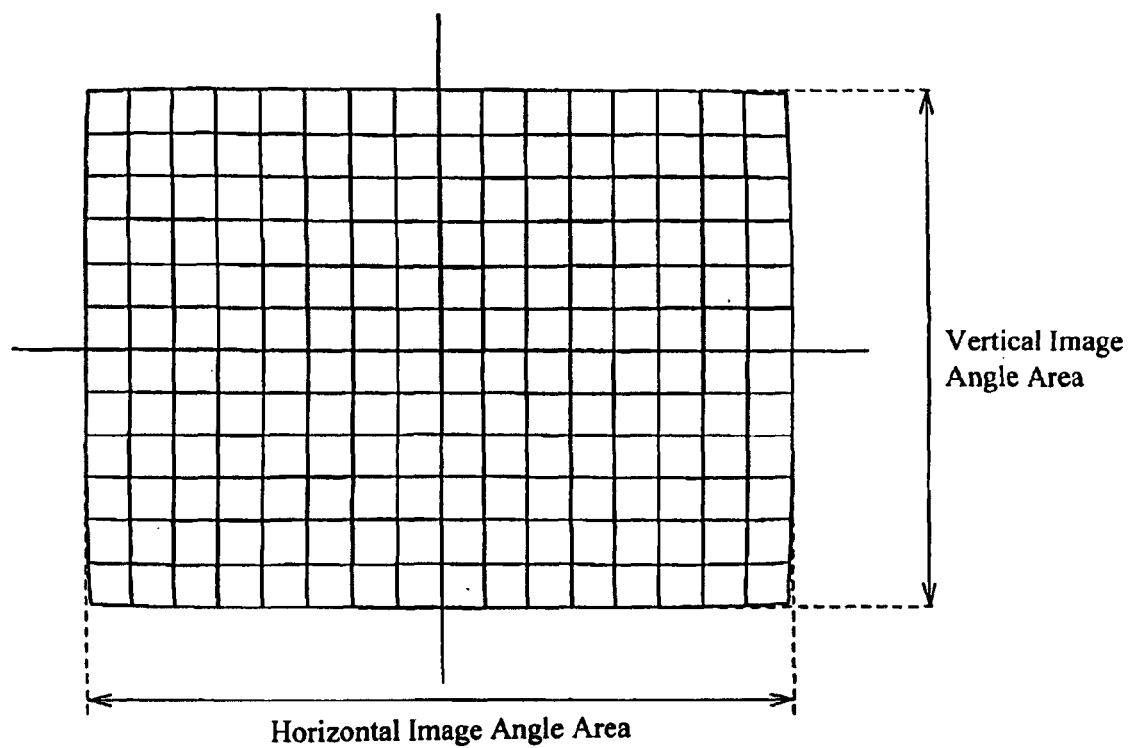
FIG. 7 is a diagram of an actual image of a rectangular grid object subject to balancing optical distortion and TV distortion of the single focus lens according to Embodiment 2.
Figure 8:
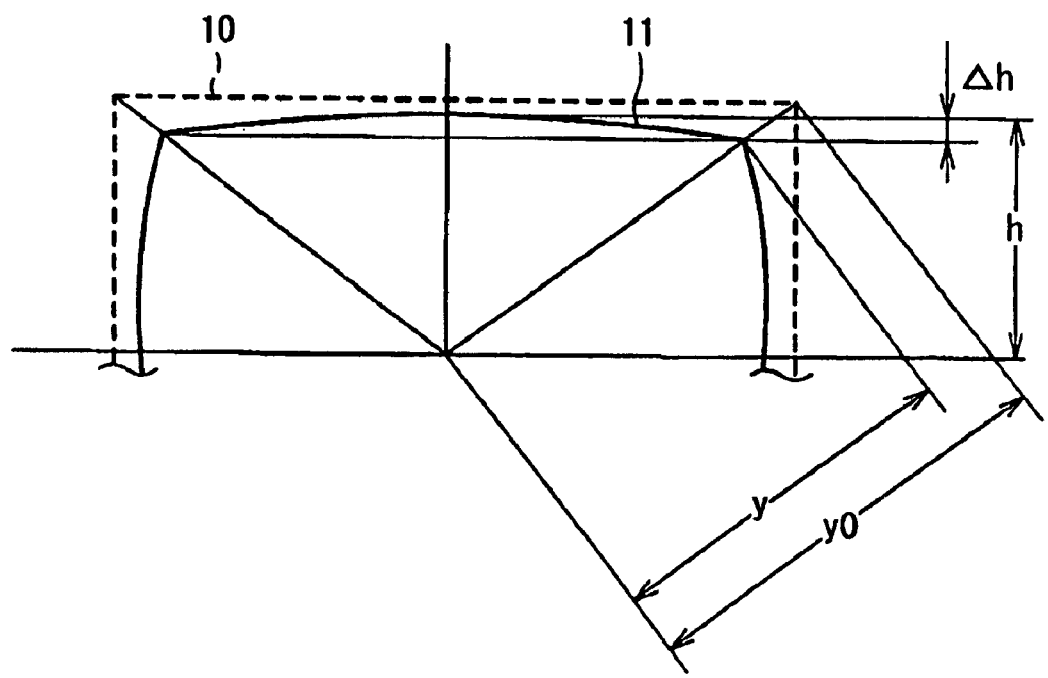
FIG. 8 shows an ideal image and an actual image with distances for determining optical distortion and TV distortion indicated.

FIG. 7 is a diagram of an actual image of a rectangular grid object subject to balancing optical distortion and TV distortion of the single focus lens according to Embodiment 2. Although FIG. 5C indicates substantial optical distortion, FIG. 7 shows that optical distortion is well balanced by TV distortion so that the distortion of the actual image of the rectangular grid object is hardly noticeable.

As is clear from the lens data and aberration curves discussed above, in Embodiment 2 the various aberrations are favorably corrected, and performance capabilities that are suitable for a compact single focus lens without noticeable distortion of an actual viewed image can be obtained.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components-may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An optical system that satisfies comprising a plurality of lens elements and a stop that form an optical image, said optical system satisfying the following conditions for an image formed by the optical system:

$$2.0\% < |DIST6| < 5.0\%$$

$$|DIST8 - DIST6| < 0.5\%$$

$$|DIST10 - DIST8| < 1.8\%$$

where

DIST6 is the optical distortion of the image at 60% of the maximum image height, DIST8 is the optical distortion of the image at 80% of the maximum image height, and DIST10 is the optical distortion of the image at 100% of the maximum image height.

2. The optical system of claim 1, wherein the lens element on the image side of the optical system includes an aspheric lens surface.

3. The optical system of claim 2, wherein the shape of the aspheric lens surface is defined by the following equation:

$$Z = [(C \cdot Y^2)/\{1 + (1 - K \cdot C^2 \cdot Y^2)^{1/2}\}] + \Sigma(A_1 \cdot Y^i)$$

where

Z is the length, in millimeters, of a line drawn from a point on the aspheric lens surface at a distance Y from the optical axis to the tangential plane of the aspheric lens surface vertex, C is the curvature, in millimeters to the minus one power, of the aspheric lens surface on the optical axis, Y is the distance, in millimeters, from the optical axis, K is the eccentricity, and $A_i$ is the ith aspheric coefficient, the summation extends over i for i equal to three or greater, and at least one odd-order aspheric coefficient $A_i$ of order three or greater is nonzero.

4. The single focus lens of claim 3, wherein the optical system is a single focus lens that includes at least two lens elements made of plastic.

5. The optical system of claim 1, wherein the optical system is a single focus lens that includes at least two lens elements made of plastic.

6. The single focus lens of claim 2, wherein the optical system is a single focus lens that includes at least two lens elements made of plastic.

* * * * *

UNITED STATES PATENT AND TRADEMARK OFFICE
CERTIFICATE OF CORRECTION

PATENT NO. : 6,882,483 B1
DATED : April 19, 2005
INVENTOR(S) : Sato

It is certified that error appears in the above-identified patent and that said Letters Patent is hereby corrected as shown below:

Column 8,
Line 37, change the $A_{10}$ value for surface #2 from "1.0112E-3" to -- 1.0112E-1 --; and Column 9,
Line 16, change "components-may" to -- components may --.

Signed and Sealed this

Twelfth Day of July, 2005

JON W. DUDAS
*Director of the United States Patent and Trademark Office*